Figure 1:
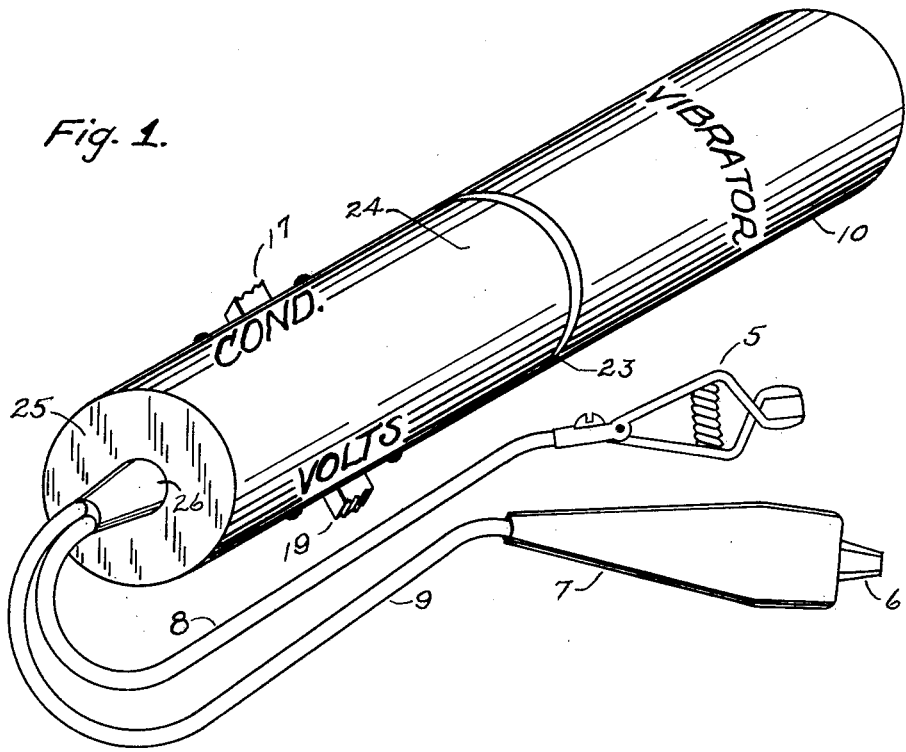

July 10, 1962 W. C. WALKER 3,044,011
DEVICE FOR TESTING A SPARK IGNITION SYSTEM
Filed July 2, 1956 2 Sheets-Sheet 1

Inventor
Willie Charles Walker

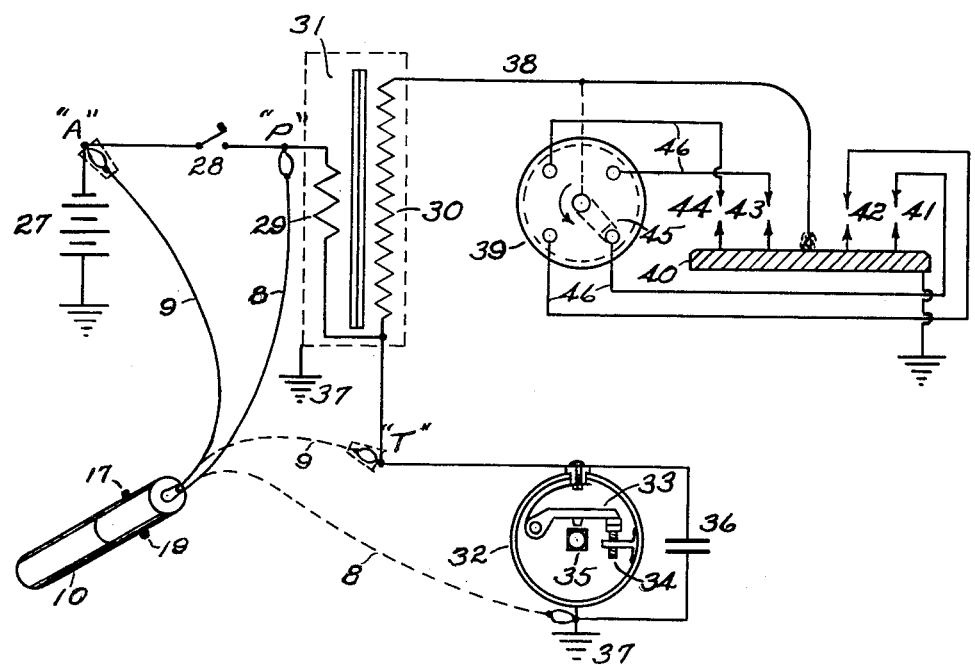

United States Patent Office 3,044,011
Patented July 10, 1962

3,044,011
DEVICE FOR TESTING A SPARK IGNITION SYSTEM
Willie Charles Walker, 532 12th Ave., Tuscaloosa, Ala.
Filed July 2, 1956, Ser. No. 595,186
4 Claims. (Cl. 324—15)

The object of the invention is to produce an ignition tester of pocket size and utter simplicity that will make rapid and accurate checks, both in the shop and in the field, that can be manufactured both cheaply and easily, and be sold and distributed to the trade for a modest price.

To produce an electric spark from a battery three essentials are necessary:
 (1) A spark coil.
 (2) Some form of interrupter to make and break the battery current.
 (3) A suitable condenser, bridged across the interrupter, to strengthen and reinforce the spark.

In a gasoline engine the interrupter is the breaker points located in the distributor. These are geared to the crankshaft and operate only when the motor is running.

Various forms of motor analyzers or testers utilize a separate pair of points, or distributor for making tests. This requires that this distributor be actuated by some form of electric motor. Since size or bulk presents no problem in the shop these analyzers have become orthodox equipment.

The electro-magnetic interrupter is known in the electronics field as a vibrator. It is self contained and of small size. The kind used in my ignition tester is the popular shunt type, so named because the internal vibrator coil is connected in shunt, or parallel across the two main vibrator connections. By using these two main connections it will not only interrupt an external circuit, but be self-energizing as well. This is one of the salient features of my invention—two, and only two test leads are needed in testing a spark ignition system.

Thus by combining a test condenser with a shunt vibrator, a pocket size, dynamic comparative type tester of great utility is produced.

Since there are at the present time two voltage systems, viz., (6 and 12 volt) employed on modern automobiles, a slight modification of a stock vibrator is made to accomplish this end. Just how this is done is most unique and novel, and represents an outstanding feature of my testing device. One of the vibrator coil ends is removed and re-connected to an unused terminal on the base so that a dropping resistor with shorting switch can be used externally to enable operation on both voltages.

In theory it is immaterial just which coil end is used. Usually it is the "finish" as it is more accessible or convenient. Here "start" and "finish" are synonomous with "inside" and "outside" ends respectively. Actually there is little choice, for in most vibrators there is only one end and that is the "finish." This is because the "starting" end is attached to the coil bobbin and makes its contact through the iron core of the coil.

Although the customary spark gap is not included in my invention all high-voltage tests may be made by using the high tension wire from the ignition coil and playing the spark upon the suspected part, or frame of the car, as the test at hand might indicate. This does not constitute a shock hazard because the spark current is of infinitesimal value. Simplicity characterizes my invention, and the absence of a spark gap makes it even simpler.

Other features include plug-in vibrator means whereby compatible vibrators of 12, 24, and other voltages may be used; and wherein the vibrator can be unplugged to provide a spare, or test condenser that can be used in the field to enable customer to bring car into shop for an exact replacement.

My invention comprises not only a device, but also a method for testing a spark ignition system. In this method there are two modes of operating and one method of connecting. Depending on whether the tester is in the "low," or "high" side of the ignition coil primary circuit, the modes are:
 (1) The bridging of the tester across the distributor breaker points known as the conventional method.
 (2) The "high" side testing by bridging across the ignition switch.

The method of connecting only one full insulated test lead is used to protect the operator from accidental shock, and the equipment from misuse or damage. In a preferred embodiment one of the two test leads is made of black wire and has a plain clip, while the other is made of red wire and has an insulated clip. Then to accomplish the method, attach the black wire with plain clip to ground, or "low" side of the circuit first, and make or break the circuit with the red insulated lead.

Actually it is immaterial which test lead is fully insulated as all comonent parts of my invention are electrically isolated from the case and neither lead is considered to have any actual distinguishing electrical characteristic over the other. Red and black are the two most used colors in test lead wires and the color red signifies danger and the use of caution. Thus you see some of the interesting and novel features of my invention. Others will become apparent as it is described in detail.

Figure 3:
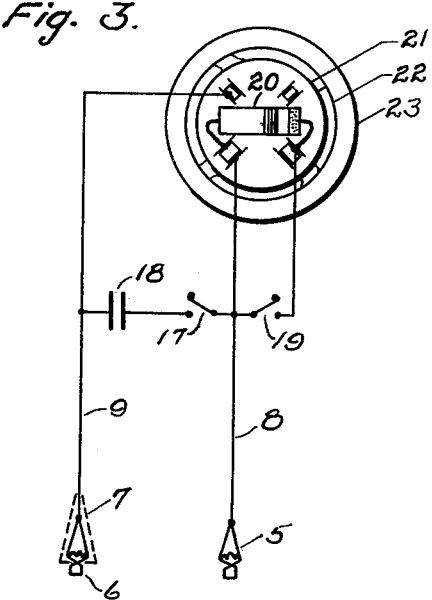
Figure 2:
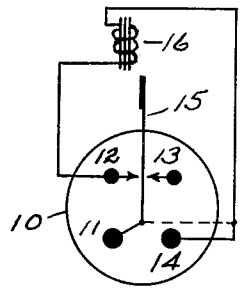

To better illustrate my invention I offer the following drawings:
 FIG. 1 is an oblique drawing of my ignition testing device which shows the instrument to its best advantage.
 FIG. 2 is a schematic diagram of the vibrator only.
 FIG. 3 is an underside view of the vibrator socket showing the "dropping" resistor wired in place. The rest of the circuit is shown in schematic.
 FIG. 4 is a wiring diagram of a typical 4-cylinder ignition system showing how my device is used to diagnose trouble.

Referring to FIGS. 1 and 3, case 24 has ends 25 and 23. End 25 is drilled to accommodate cord strain reliever grommet 26, while end 23 is punched to receive vibrator socket 21 held in place by spring retainer 22. Thus vibrator 10 is seen to plug into the end of case 24.

Referring to FIG. 2 the numbers 11 to 14 within the circle refer to the prongs of vibrator 10 so that this constitutes a base view. Then as FIG. 3 is an underside socket view these said prongs match and plug into the corresponding terminals of socket 21 so that test lead 9 makes contact with prong 12 and resistor 20 with numbers 11 and 14 respectively.

Resistor 20, shown as it appears, is a "dropping" resistor to enable a 6-volt vibrator to be used on a 12-volt supply. To do this it must drop the voltage to the vibrator coil only and introduce absolutely no resistance in the test leads or external circuit. This calls for a modification of a stock vibrator.

The dotted line (-----) shown in FIG. 2 indicates the original connection in a conventional shunt vibrator. The inventor has moved this wire from prong 11 to unused prong 14; so that dropping resistor 20 with shorting switch 19 can be in series with vibrator coil 16.

For 12-volt operation switch 19 is in "open" position so that current must flow through resistor 20 and coil 16; for 6 volts, switch 19 is closed thereby shorting out resistor 20.

In the experimental model test lead 9 is fully insulated. It is made of red test lead wire and has a red insulator 7 over its clip 6, whereas test lead 8 is of black wire and has a plain clip 5. The idea here is that only one fully insulated test lead is actually better than two.

Condenser 18 shown symbolically in FIG. 3 is the test condenser. It is contained inside case 24, supported by its own wire leads and connected as shown.

Switches 17 and 19, designated Condenser and Volts respectively on case 24 are of the simple (on-off) sliding type; they are further labelled "on—off" and "6—12."

Resistor 20 is a 39 ohm 2 watt resistor, its value is not critical. Test condenser 18 is of 0.25 mfd., which is the most appropriate commercial size and was used in preference to an automobile distributor condenser because some tests require it to be isolated from ground.

The vibrator used was the Mallory 4—4.

In order to use the invention to its fullest posibilities a working knowledge of the vibrator and how it operates is necessary.

With switch 19 closed vibrator coil 16 is connected across prongs 11 and 12 just as are the test leads. Then if the test leads are bridged across ignition switch 28 in FIG. 4, the ignition circuit will be completed and vibrator coil 16 will draw current magnetizing its core and attracting reed 15 until it makes contact with 12. At this instant test leads 8 and 9 are short-circuited allowing full ignition current to flow, but reducing the current in coil 16 to zero. Under these conditions its field collapses and the spring tension in reed 15 will cause it to fly to the right and make contact with 13 thereby interrupting the ignition current. This completes the cycle and coil 16 will again draw current attracting reed 15 over to the left. The process will continue at the natural frequency of the vibrator until one of the test leads is removed and the circuit is broken.

This interruption of the ignition current will cause a high voltage spark to be produced by induction. However the spark will not be maximum unless switch 17 is closed by passing condenser 18 across the test leads, and or vibrator contacts. This quenches the arcing and will strengthen and reinforce the spark.

Referring to FIG. 4 which is a typical 4-cylinder ignition system, the primary or battery circuit is composed of battery 27, ignition switch 28, primary winding 29 of spark coil 31, and distributor 32 comprising breaker arm 33, point 34, cam 35, and distributor condenser 36 with common ground 37.

The high-tension circuit is composed of secondary winding 30 of spark coil 31, distributor cap 39, high tension coil wire 38, cylinder head 40, spark plugs 41 to 44 inclusive, rotor 45 (shown invisible) and spark plug wires 46.

The above constitute the conventional components of a typical ignition ssytem and comprise no part of my invention. It is used for demonstrative purposes only.

Inasmuch as this is a method as well as a device for testing a spark ignition system, three test points have been designated, namely A, P, and T for convenience. "A" is the "hot" of high side of the battery and amounts to any place the battery voltage can be obtained. "P" represents the primary or battery connection of the spark coil, and "T" is the combined low and high-tension, or timer connection.

Examining FIG. 4 it is seen that my ignition tester is connected in two different ways. Solid test leads 8 and 9 show the connection for mode 2, or bridging of the ignition switch; while the dotted test leads indicate the conventional method of bridging the breaker points.

Regardless of which mode of operation is used it is advantageous to connect test lead 8 with plain clip first, and then make or break the circuit with test lead 9 that has the insulated clip. In this manner one insulated clip is just as efficient as two, but this is not the only advantage. If lead 8 connected to "P" is unclipped first and dangles, it is seen to constitute a short circuit. This could ruin the vibrator 16 in the tester and discharge the battery 27. On the other hand, to remove lead 8 from ground first and leave dangling would be to provide an intermittent sporadic connection. This method is easily learned.

Before making any tests, set the Volts switch of the tester to the correct battery voltage (6 or 12), and remove high-tension coil wire 38 from center of distributor cap 39 (shown by dotted line). The solid portion of wire 38 shows how it is used as a probe to direct the spark upon the cylinder head 40.

To test ignition coil 31 set Condenser switch to "On" and bridge ignition switch by connecting tester to test points "P" and "A" in that order. A full hot spark of (¼") or better between wire 38 and ground indicates a good coil.

The breaker points 33 and 34 are checked at this time by short-circuiting along point "T" with a screwdriver. If spark improves they are probably bad. To investigate remove distributor cap 39 and open and close arm 33 several times. If operation is erratic file or replace breaker points.

In testing distributor condenser 36, connect tester according to the conventional method as shown by the dotted lines of FIG. 4. For this test ignition switch 28 must be closed and the breaker points opened. To do the latter either wedge the points open, or cause the engine to be rotated slowly until cam 35 opens arm 33. If spark improves when Condenser switch is moved to "On" position, the distributor condenser is "open" or defective, and should be replaced. Should the vibrator fail to operate, it means that condenser 36 is "shorted" or some defect exists in distributor 32. Remove condenser lead to verify. Replace condenser or make necessary repairs.

To check the high tension system connect the tester by the mode that suits the operator best. Either connection will produce a full hot spark, just as either one can be used in testing an ignition coil. Remove distributor cap 39 and turn underside toward operator. Using wire 38 as an exploring probe direct the sparks on or ground all contacts. If an arc is drawn and the spark follows a definite path, a crack or defect is indicated. Replace distributor cap.

Now play spark upon rotor 45 (shown invisible in FIG. 4). If crack or defect is found, the rotor may be replaced.

In making exhausting tests of spark plug wires 46, it might be helpful to use a screwdriver to short-circuit the spark plug of the wire being tested. This same operation might be used to advantage in distributor cap testing just described.

This concludes the instructions on testing. To one possessing skill and ingenuity other tests might be possible.

As the invention is a comparative type tester it might be well to have on hand a similar ignition coil known to be perfect for use as a standard of comparison. This will also aid the operator in obtaining extra skill and experience.

Although the invention is substantially as shown and described, commercial practice may impart certain other improvements such as:

(1) A case with twist-lock ends affording both ease of assembly and repair.

(2) A vibrator base retainer ring, or sleeve with buckle to impart rigidity to the two halves of the instrument and adapt it to professional or extreme service use.

(3) A swivel type of open hook on the end of the vibrator to facilitate carrying on the belt, or for hanging on the radiator tie rod or other convenient place when in use.

These refinements are all superficial in nature and do not pertain directly to the particular merits of the invention.

Apart from all design changes or possible improvements, I desire to describe the following as my invention:

The use of other "dropping resistors" with suitable shorting type switch as means adapted to enable my electrical testing device to be used on a plurality of voltages.

The use of other "test condensers" with suitable switch as may be required in ignition testing on a plurality of voltage systems.

Having thus described the invention, I claim:

1. A device for testing the ignition system of an internal combustion engine comprising in combination: a standard shunt-type vibrator having a base with at least one unused terminal, the internal structure of which contains a vibratable reed alternately interrupting a first-contacted contact and a second-contacted contact, designated for convenience as the first and second contacts respectively, and a vibrator coil with only two connections, namely, an inside end and an outside end connected to the said first contact and reed respectively, thereby providing both energizing and interrupting means to the vibrator when external connection is made to said reed and first contact; a modification of said vibrator wherein the outside end of the vibrator coil has been moved from the reed to an unused terminal on its base, thus permitting a dropping resistor to be used externally to the vibrator; a suitable socket having test leads connected thereto into which said vibrator is plugged; a dropping resistor with shorting switch connected to socket terminals corresponding to the reed and the now occupied formerly unused terminal so as to enable said vibrator to be used on either a (6) six volt or (12) twelve volt system; a condenser, substantially equivalent to a distributor condenser, wired in series with a simple switch and this combination bridged across said test leads as means adapted to provide a test condenser; said test leads being connected to socket terminals corresponding to said reed and first contact, with their free ends terminating in clips, one of which is uninsulated and the other insulated.

2. An electrical testing device identical in all respects to the one described in claim 1, except: the vibrator coil is connected in reverse, and it is the inside end of said coil that is moved in the modification thereof.

3. A device for testing the ignition system of an internal combustion engine comprising in combination: a standard shunt-type vibrator having a base with at least one unused terminal, the internal structure of which contains a vibratable reed alternately interrupting a first-contacted contact and a second-contacted contact, designated for convenience as the first and second contacts respectively, and a vibrator coil with only two connections, namely, an inside end and an outside end connected to the said first contact and reed respectively, thereby providing both energizing and interrupting means to the vibrator when external connection is made to said reed and first contact; a modification of said vibrator wherein the inside end of the vibrator coil has been moved from the said first contact to an unused terminal on its base, thus permitting a dropping resistor to be used externally to the vibrator; a suitable socket having test leads connected thereto into which said vibrator is plugged; a dropping resistor with shorting switch connected to socket terminals corresponding to the said first contact and the now occupied formerly unused terminal so as to enable said vibrator to be used on either a 6-volt or 12-volt system; a condenser, substantially equivalent to a distributor condenser, wired in series with a simple switch and this combination bridged across said test leads as means adapted to provide a test condenser; said test leads being connected to socket terminals corresponding to said reed and first contact, with their free ends terminating in clips, one of which is uninsulated and the other insulated.

4. An electrical testing device identical in all respects to the one described in claim 3, except: the vibrator coil is connected in reverse, and it is the outside end of said coil that is moved in the modification thereof.

References Cited in the file of this patent

UNITED STATES PATENTS

| | | |
|---|---|---|
| 1,665,567 | Slifer | Apr. 10, 1928 |
| 2,135,269 | Allen | Nov. 1, 1938 |
| 2,152,650 | Kilborn | Apr. 4, 1939 |
| 2,286,847 | Garstang | June 16, 1942 |
| 2,330,431 | Klotsch | Sept. 28, 1943 |
| 2,450,524 | Root | Oct. 5, 1948 |
| 2,501,802 | Walker | Mar. 28, 1950 |
| 2,703,376 | Board | Mar. 1, 1955 |
| 2,712,633 | Jameson | July 5, 1955 |
| 2,734,962 | Cook | Feb. 14, 1956 |
| 2,796,578 | Barnes | June 18, 1957 |
| 2,851,653 | Ellison | Sept. 9, 1958 |
| 2,860,290 | Fettinger | Nov. 11, 1958 |
| 2,864,979 | Williamson | Dec. 16, 1958 |
| 2,898,546 | Steffenson | Aug. 4, 1959 |

FOREIGN PATENTS

| | | |
|---|---|---|
| 105,319 | Australia | Oct. 13, 1938 |
| 647,115 | Great Britain | Dec. 6, 1950 |
| 684,791 | Great Britain | Dec. 24, 1952 |